March 22, 1960 — R. I. HOMIER — 2,929,438
SEAT SUPPORTING MECHANISM
Filed Aug. 7, 1957 — 4 Sheets-Sheet 1
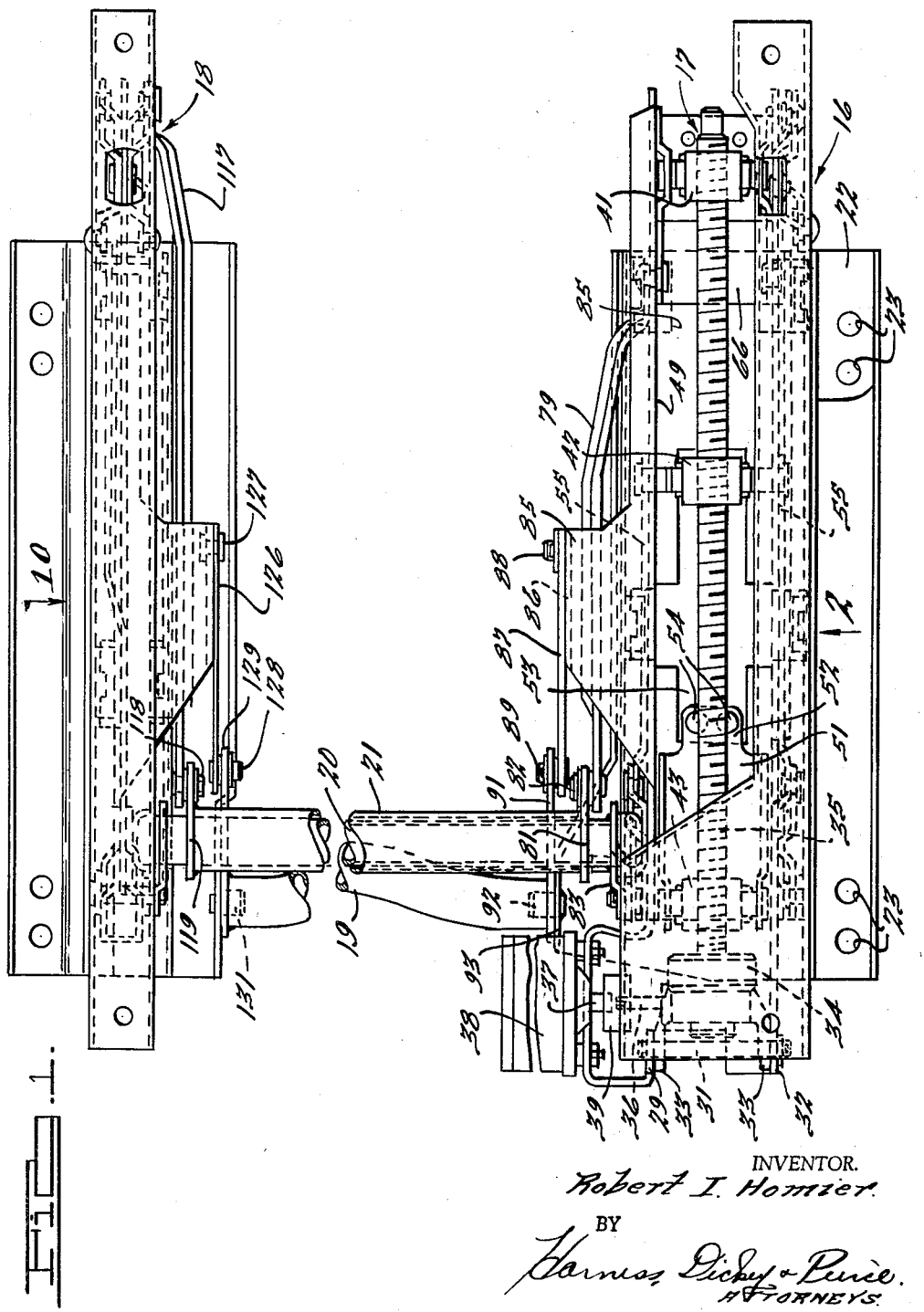
INVENTOR.
Robert I. Homier
BY
Harness, Dickey & Pierce
ATTORNEYS

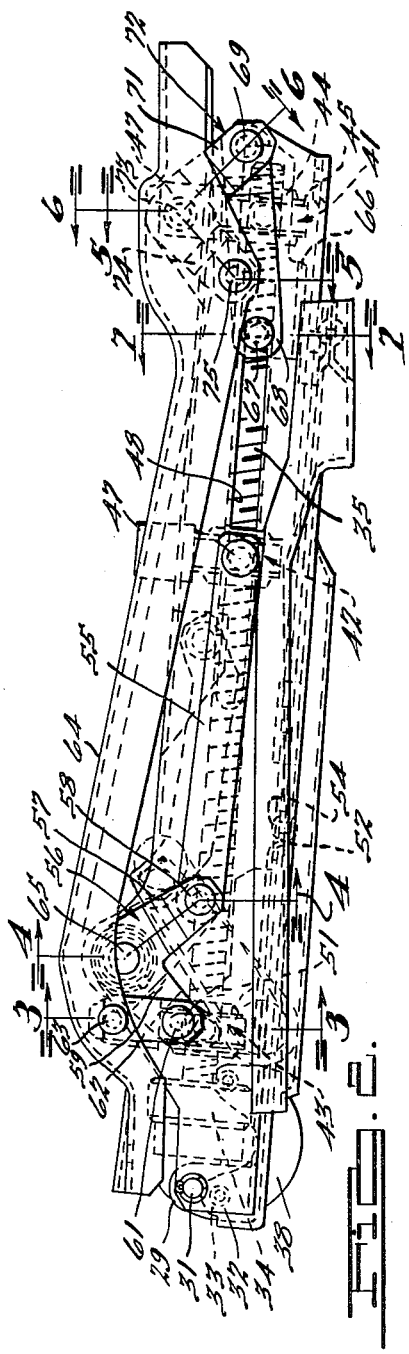

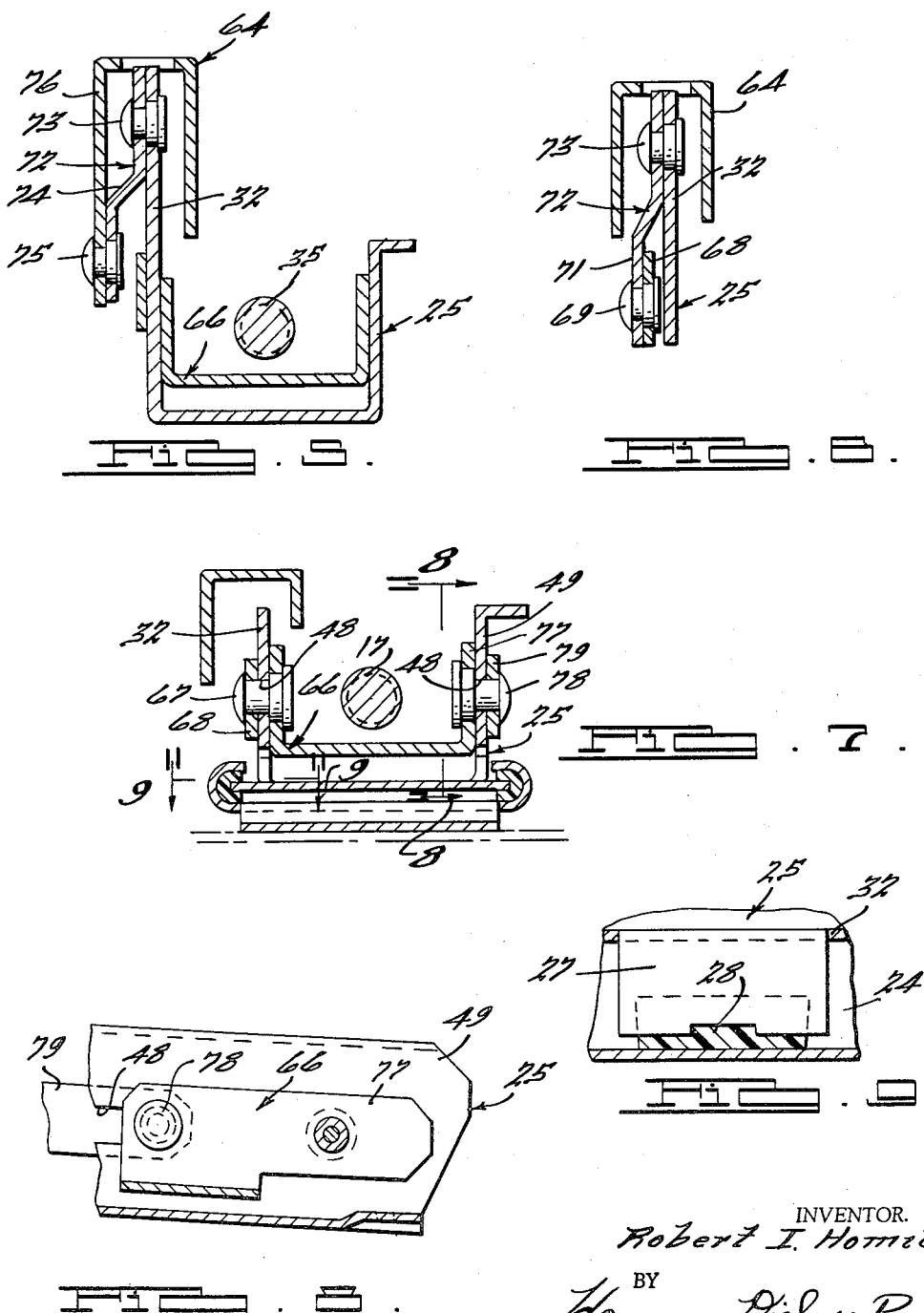

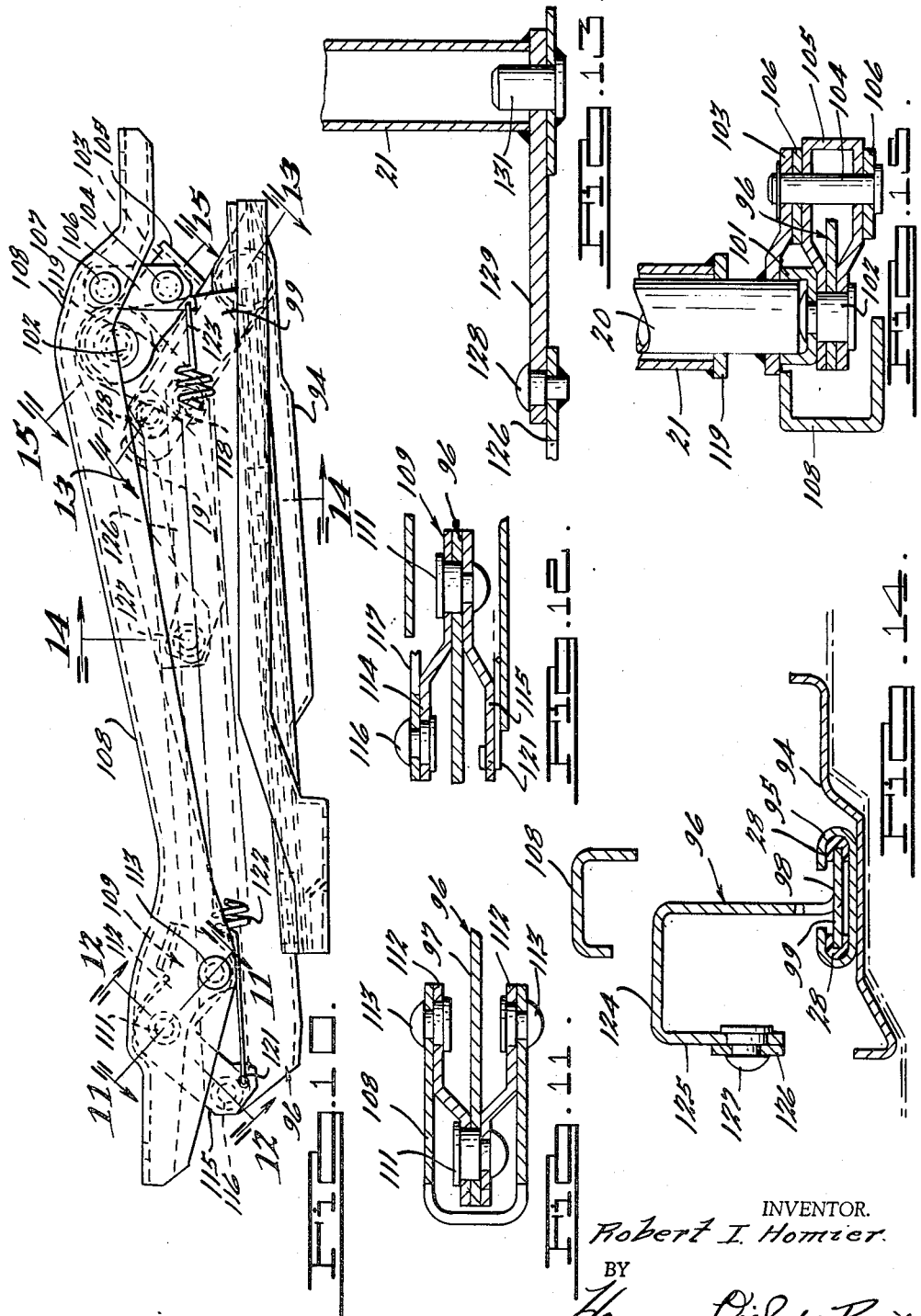

United States Patent Office 2,929,438
Patented Mar. 22, 1960

2,929,438

SEAT SUPPORTING MECHANISM

Robert I. Homier, Detroit, Mich., assignor to American Metal Products Company, Detroit, Mich., a corporation of Michigan Application August 7, 1957, Serial No. 676,750

9 Claims. (Cl. 155—14)

This invention relates to seat supporting devices and particularly to a seat supporting device comprising spaced mechanisms, one of which carries the motor actuated elements which operates both of the mechanisms.

The device of the present invention is known as a six-way mechanism as the seat supported thereby is movable forwardly, rearwardly, upwardly and downwardly at the front end, and upwardly and downwardly at the rear end independently or simultaneously. Such adjustment raises and lowers the seat uniformly at each end or tilts the seat relative to the horizontal plane and advances the seat forwardly and rearwardly to fit the requirement of the occupant. The mechanisms have similar elements and linkage systems with only one of the mechanisms provided with the electric motor and operating elements which actuates both of the mechanisms. A linkage system on each of the mechanisms is connected to arms on the ends of three torsion bars which interconnect the mechanisms and transfer movement from the mechanism having the operating elements thereon to the other mechanism. Thus, the seat supporting element of both mechanisms will be shifted in synchronism in all of the adjustments in the horizontal and vertical planes.

Accordingly, the main objects of the invention are: to provide a seat supporting device made up of a pair of spaced mechanisms which have similar supporting and linkage systems which are shifted by the operating elements carried by one of the mechanisms; to provide a pair of seat supporting mechanisms for adjusting the seat in a vertical and horizontal plane with interconnecting means which transfers the force from operating elements of one mechanism across to the other mechanism so that the two mechanisms are operated in synchronism; to provide a seat supporting device with a pair of mechanisms, only one of which supports a motor and operating elements for producing the synchronized movements of the seat supporting elements of both of the mechanisms, and in general to provide a seat supporting device which is simple in construction, positive in operation, economical to manufacture.

Other objects and features of novelty of the invention will be specifically pointed out or will become apparent when referring, for a better understanding of the invention, to the following description taken in conjunction with the accompanying drawings wherein:

Figure 1 is a broken plan view of a seat supporting mechanism embodying features of the present invention;

Fig. 2 is a view in elevation of the structure illustrated in Fig. 1, as viewed from the point 2 thereof;

Figs. 3, 4, 5, 6 and 7 are enlarged sectional views of the structure illustrated in Fig. 2, taken respectively on the lines 3—3, 4—4, 5—5, 6—6 and 7—7 thereof;

Figs. 8 and 9 are sectional views of the structure illustrated in Fig. 7, taken respectively on the lines 8—8 and 9—9 thereof;

Fig. 10 is a view in side elevation of the structure illustrated in Fig. 1, as viewed from the point 10 thereof, and Figs. 11, 12, 13, 14 and 15 are all sectional views of the structure illustrated in Fig. 10, taken respectively on the lines 11—11, 12—12, 13—13, 14—14 and 15—15 thereof.

Referring to the figures, a seat supporting mechanism 16 for the left-hand side of the seat, as viewed from the position of the occupant, contains the operating device 17 for power shifting the supported seat. A seat supporting mechanism 18 for the right-hand side of the vehicle has similar functional parts to those of the mechanism 16 so that similar action is produced to the elements thereof by the device 17 which powers the mechanism 18. The device 17 of the mechanism 16 operates through interconnecting torsion bars 19, 20 and 21 the corresponding elements of the seat supporting mechanism 18.

The seat supporting mechanism 16 is clearly illustrated in Figs. 2 to 9 inclusive and will now be described in detail. A base supporting stamping 22 has apertures 23 by which it is secured to the floor of a vehicle. Upon the base stamping 22, a slide retaining channel element 24 is secured by rivets or spot-welding or both. A forwardly and rearwardly shiftable upwardly presenting channel element 25 is mounted in the channel element 24. The channel element 25 has spaced struck-out tongue portions 27 in the plane of its web thereof which have blocks 28 of low friction material secured thereto, preferably in a manner as illustrated, described and claimed in the copending application of Russell G. Heyl, Jr., Serial No. 684,442, filed Sept. 17, 1957, and assigned to the assignee of the present invention.

The channel element 25 has a stuck-up tab 29, as illustrated in Figs. 1 and 2 which forms a support for a pin 31, the opposite end of which passes through the left-hand wall 32 of the channel element 25. The pin passes through the ears 33 of the gear housing 34 of the drive mechanism for a lead screw 35 which is carried in the lower part of the channel element 25. Reduction gearing of types known in the art to be suitable is driven by a shaft 36, interconnected to a shaft 37 of a reversing motor 38 by a suitable drive connection 39. The lead screw has a plurality of nut assemblies thereon, herein illustrated as three in number, indicated by the numerals 41, 42 and 43. Each nut assembly embodies a nut mounted in a housing and interconnected by a clutch or brake which holds the nut when a solenoid associated therewith is energized for producing a driving relation between the nut and lead screw. This is more specifically illustrated, described and claimed in the copending application of R. J. Williams, Serial No. 481,562, filed January 13, 1955, and assigned to the assignee of the present invention, now Patent No. 2,857,776.

In Fig. 2 the nut assemblies 41, 42 and 43 are illustrated as embodying a nut 44 and a housing 45 having shouldered screws 46 extending from opposite sides thereof. A solenoid 47 when energized, has its armature 47a urge its ball end 40 into a V-shaped groove 50 in the nut 44 to secure it relative to the housing against rotation and thereby produces a driving relation between the thread of the nut and the thread of the lead screw. When the load reaches a predetermined amount either because of overload or the striking of an obstacle by the nut assembly, the ball end 40 will cam out of the V-shaped groove 50 and the nut will thereafter rotate with the lead screw until the operator cuts off the current to the motor 38 and the solenoid 47. Upon the reversal of the motor and the re-energization of the solenoid, the nut will retract upon the lead screw due to the re-engagement of the ball end 40 in the V-shaped slot 50 due to the energization of the solenoid. Should an overload again occur, for the reasons above set forth, the ball end 40 will again be urged from the V-shaped groove 50 against the bias of the solenoid to permit the nut to rotate with the lead screw until the motor and solenoid are again de-energized. The shouldered screws 46 of the assembly 42 project through slots 48 in the walls 32 and 49 of the horizontally movable channel element 25. The shouldered screws 46 of the nut assembly 43 are connected to a link member 51 of channel shape, as clearly illustrated in Figs. 1, 2 and 3. The web of the channel shaped link member 51 is extended at 52 and flanged downwardly so as to extend through an aperture 53 in the channel element 25 into engagement with the web of the base stamping 22 to which it is secured by a pair of rivets 54. When the nut assembly 43 is held in its housing against rotation, the driving of the lead screw causes the lead screw to move through the nut assembly due to the fact that the extending end of the channel member 51 is secured to the base, thereby shifting the channel element 25 and all of the elements thereon forwardly or rearwardly on the supporting channel 24.

When the nut assembly 42 is energized, the shouldered screws 46 slide in the slots 48 and operate a pair of links 55 on opposite sides of the channel element 25 to actuate a pair of bell cranks 56 through the pivoted connection to the one arm 57 thereof by rivets 58. The arms 59 of the bell cranks 56 are pivotally connected to the lower end of links 62, the upper ends of which are secured by rivets 63 to the flanges of an inverted seat supporting channel element 64, the pivotal connection adjacent to the wall 32 being a rivet 60 and that adjacent to the inner wall 49 being a removable pin 61. Through the reciprocal motion of the links 55 due to the forward and rearward movement of the nut assembly 42, the bell crank is rotated upwardly, from the position illustrated to raise the forward end of the seat supporting element 64, when the nut assembly 42 is advanced forwardly and when the nut assembly is retracted, the bell crank is rotated counterclockwise, thereby lowering the forward end of the element 64. The bell cranks 56 are pivoted interjacent the arms 57 and 59 by rivets 65 to the walls 32 and 49 of the channel element 25.

The shouldered screws 46 of the nut assembly 41 are connected to the rearward end of the side flanges of a channel-shaped link 66, the forward end of which on the side adjacent to the wall 32 of the element 25 is connected by a rivet 67 to a link 68. The rivet 67 is shouldered and extends through the slot 48 in the wall 32 of the channel element 25. The opposite end of the link 68 is connected by a rivet 69 to one arm 71 of a bell crank 72. The bell crank is secured by a rivet 73 to the wall 32 of the channel element 25. It will be noted from Figs. 5 and 6 that the seat supporting element 64 is of narrow width at the rear end to encompass the wall 32 and the bell crank 72. An adjacent arm 74 of the bell crank 72 is secured by a rivet 75 to the outside flange 76 of the seat supporting channel element 64. The two pivoted links 66 and 68 permit the operating nut assembly 41 to move further rearwardly on the lead screw 35. Otherwise, the lead screw 35 could be directly connected to the arm 71 of the bell crank 72. The inboard portion 77 of the channel-shaped link 66 is joined by a rivet 78 which is extended through the slot 48 in the wall 49 of the channel element 25. By having the rivets 67 and 78 of the links on the nut assembly 41 and shouldered pins 46 of the nut assembly 42 operate within the slots 48 in the walls of the channel element 25, the lead screw 35 is relieved of bending strain and possible fracture. The rivet 78 is joined to a link 79 which extends forward and is secured to an arm 81 on a torsion bar 21 by a pin 82. The arm 81 pivots upon the inner torsion tube 20 which is welded to one end of an arm 83, the opposite end of which is pivoted on the pin 61, as clearly illustrated in Figs. 3 and 4. The end of the tube 20 is press-fitted within a cup member 84 which is secured to the end of the rivet 65 to rotate thereon. Thus, the torsion bar 21 is rotated when the arm 74 of the bell crank 72 is swung about the pivot 73.

It will be noted in the mechanism 16 of Fig. 1 that the upwardly extending wall 49 is flanged outwardly at 85 and is flanged downwardly at 86 to form a support for a link 87 which is secured thereto by a pin 88. The opposite end of the link 87 is connected by a pin 89 to an arm 91 which is pivoted on a pin 92 secured to the upwardly extending flange 93 of the base stamping 22 as illustrated in Fig. 3. The arm 91 is welded to the cranked torsion bar 19, the crank portion of which extends over the tunnel in the center of the vehicle floor.

Referring to Figs. 10 to 15 inclusive, the seat supporting mechanism 18 is clearly illustrated, as comprising a base element 94 having a channel-shaped slide encompassing member 95 riveted, welded or otherwise secured thereto. A slide 96 embodies a vertically extending wall 97 flanged outwardly at 98 at the bottom, with a pair of tongues 99 struck from the wall and disposed in aligned relation to the flange 98. Low friction shoes 28 are locked to the edge of the flange within the encompassing channel element 95, as disclosed above and described in the first of the above mentioned copending applications. The forward end of the mechanism, as illustrated in Figs. 10 and 15, has the torsion bar 20 press-fitted into a cup 101 which is secured to a rivet 102 which extends through the slide 96. An arm 103, which is the same dimension as the arm 83 on the mechanism 16, is welded to the torsion tube 20 adjacent to the cup 101. The arm 103 is secured by a pin 104 to a channel shaped link 105. The pin also pivotally secures one end of a pair of freely swingable links 106 thereto. The opposite ends of the links are secured by rivets 107 to the flanges of the seat supporting channel element 108. When the arm 83 of the torsion tube 20 of the mechanism 16 is swung in an arc, the arm 103 of the mechanism 18 is similarly swung to raise the forward end of the seat supporting element 108 through the links 106 the same amount as the seat supporting element 64 is directly raised by the operating device carried by the mechanism 16.

The rear end of the mechanism 18 has a pair of connected bell cranks 109 secured by a rivet 111 to the vertically disposed wall of the slide 96. The arms 112 of the bell cranks are secured by rivets 113 to the side walls of the seat supporting element 108. The bell crank 109 has parallel extending arms 114 and 115 disposed at substantially right angles to the arms 112. The arm 114 is secured by a rivet 116 to a connecting link 117 which extends forwardly and is secured by a pin 118 to an arm 119 which is welded to the adjacent end of the torsion tube 21. The arm 119 has the same dimensions as the arm 81 at the opposite end of the torsion tube which, when moved by the link 79, rotates the torsion tube 21, to thereby produce the same action to the arm 118 and link 117, to raise or lower the rear ends of the seat supporting channel elements 64 and 108 simultaneously. The leg 115 which is parallel to the leg 114 of the bell crank 109 has an end 121 of a spring 122 connected thereto to assist in the raising of the rear end of the seat. The opposite end 123 of the spring 122 is secured in a notch in the forward end of the slide 96.

The slide 96, as illustrated in Figs. 1 and 14, is flanged inwardly to provide a web 124 and a downwardly extending flange 125. A link 126 is secured by a rivet 127 to the flange 125, this link corresponding to the link 87 in the left-hand mechanism 16. The opposite end of the link 126 is secured by a pin 128 to an arm 129 which corresponds to the arm 91 which is welded to the torsion tube 21 adjacent to the mechanism 16. The arm 129 is welded to the adjacent end of the torsion bar 19 to be pivoted on a rivet 131 which is similar to the rivet 92. When the link 87 is advanced or retracted with the movement of the seat supporting element 25, a similar movement is produced to the slide 96 from the arm 91 through the torsion tube 19, the arm 129 and the link 126. Therefore, when the nut assembly 43 is secured against rotation, the lead screw will advance forwardly or rearwardly therethrough, depending on the direction of rotation of the motor 38 to move both of the slide elements 25 and 96 in synchronism with each other. Similarly, when the nut assembly 42 is actuated, both of the forward ends of the seat supporting channel elements 64 and 108 are moved upwardly or downwardly in the same manner the rear ends of the elements 64 and 108 are raised and lowered due to the actuation of the nut mechanism 41 along the lead screw 35.

What is claimed is:

1. In a seat supporting device, a pair of spaced mechanisms for supporting the seat, each mechanism comprising a base, a horizontally movable member on said base, and a vertically movable seat supporting element, a pair of bell crank means interconnecting the front and rear ends of the horizontally movable member and the vertically movable seat supporting member, one of said connections at one end of the device including lost motion means to permit either of the bell crank means to be operated independently of the other without binding, a lead screw mounted on one mechanism, drive means for rotating said lead screw in either direction, a plurality of solenoid actuated nut assemblies on said lead screw, one of said assemblies being connected to the bell crank means at the front end of the mechanism, a second nut assembly being connected to the bell crank means at the other end of said mechanism, means interconnecting a third nut assembly to a link member connected to said base member for shifting said horizontally movable member forwardly and backwardly relative thereto and means transferring the movement of the movable elements of one mechanism to those of the other mechanism.

2. In a seat supporting device, a pair of spaced mechanisms for supporting the seat, each mechanism comprising a base, a horizontally movable member on said base, and a vertically movable seat supporting element, a pair of bell crank means interconnecting the front and rear ends of the horizontally movable member and the vertically movable seat supporting member, one of said connections at one end of the device including lost motion means to permit either of the bell crank means to be operated independently of the other without binding, a lead screw mounted on one mechanism, drive means for rotating said lead screw in either direction, a plurality of solenoid actuated nut assemblies on said lead screw, one of said assemblies being connected to the bell crank means at the front end of the mechanism, a second nut assembly being connected to the bell crank means at the other end of said mechanism, means interconnecting a third nut assembly to a link member connected to said base member for shifting said horizontally movable member forwardly and backwardly relative thereto, means transferring the movement of the movable elements of one mechanism to those of the other mechanism, said connection between said second nut assembly and bell crank occurring through a pair of links connected together at one end by pivot means with the free end of one link joined to the nut assembly and the free end of the other link connected to the bell crank.

3. In a seat supporting device, a pair of spaced mechanisms for supporting the seat, each mechanism comprising a base, a channel-shaped horizontally movable member on said base, and a vertically movable seat supporting element, a pair of bell crank means interconnecting the front and rear ends of the horizontally movable member and the vertically movable seat supporting member, one of said connections at one end of the device including lost motion means to permit either of the bell crank means to be operated independently of the other without binding, a lead screw mounted on one mechanism, drive means for rotating said lead screw in either direction, a plurality of solenoid actuated nut assemblies on said lead screw, one of said assemblies being connected to the bell crank means at the front end of the mechanism, a second nut assembly being connected to the bell crank means at the other end of said mechanism, means interconnecting a third nut assembly to a link member connected to said base member for shifting said horizontally movable member forwardly and backwardly relative thereto, means transferring the movement of the movable elements of one mechanism to those of the other mechanism, said link to which said third nut assembly is connected being of channel shape with the web portion extended and disposed through a slot in the bottom of the channel-shaped horizontally movable member and directly connected to the base.

4. In a seat supporting device, a pair of spaced mechanisms for supporting the seat, each mechanism comprising a base, a channel-shaped horizontally movable member on said base, and a vertically movable seat supporting element, a pair of bell crank means interconnecting the front and rear ends of the horizontally movable member and the vertically movable seat supporting member, one of said connections at one end of the device including lost motion means to permit either of the bell crank means to be operated independently of the other without binding, a lead screw mounted on one mechanism, drive means for rotating said lead screw in either direction, a plurality of solenoid actuated nut assemblies on said lead screw, one of said assemblies being connected to the bell crank means at the front end of the mechanism, a second nut assembly being connected to the bell crank means at the other end of said mechanism, means interconnecting a third nut assembly to a link member connected to said base member for shifting said horizontally movable member forwardly and backwardly relative thereto, means transferring the movement of the movable elements of one mechanism to those of the other mechanism, said link to which said third nut assembly is connected being of channel shape with the web portion extended and disposed through a slot in the bottom of the channel-shaped horizontally movable member and directly connected to the base, said one nut assembly having projecting pins extending in slots in the walls of the horizontally movable channel member.

5. In a seat supporting device, a pair of spaced mechanisms for supporting the seat, each mechanism comprising a base, a channel-shaped horizontally movable member on said base, and a vertically movable seat supporting element, a pair of bell crank means interconnecting the front and rear ends of the horizontally movable member and the vertically movable seat supporting member, one of said connections at one end of the device including lost motion means to permit either of the bell crank means to be operated independently of the other without binding, a lead screw mounted on one mechanism, drive means for rotating said lead screw in either direction, a plurality of solenoid actuated nut assemblies on said lead screw, one of said assemblies being connected to the bell crank means at the front end of the mechanism, a second nut assembly being connected to the bell crank means at the other end of said mechanism, means interconnecting a third nut assembly to a link member connected to said base member for shifting said horizontally movable member forwardly and backwardly relative thereto, means transferring the movement of the movable elements of one mechanism to those of the other mechanism, said connection between said second nut assembly and bell crank means occurring through a pair of links connected together at one end by pivot means with the free end of one link joined to the nut assembly and the free end of the other link connected to the bell crank member, said link to which said third nut assembly is connected being of channel shape with the web portion extended and disposed through a slot in the bottom of the channel-shaped horizontally movable member and directly connected to the base, said one nut assembly having projecting pins extending in slots in the walls of the horizontally movable channel member, the pivot means connecting the two links extending in said wall slots, the pins and pivot means operating in said slots reducing the bending stress on the lead screw.

6. In a seat supporting device, a pair of spaced mechanisms for supporting the seat, each mechanism comprising a base, a horizontally movable member on said base, and a vertically movable seat supporting element, a pair of bell crank means interconnecting the front and rear ends of the horizontally movable member and the vertically movable seat supporting member, one of said connections at one end of the device including lost motion means to permit either of the bell crank means to be operated independently of the other without binding, a lead screw mounted on one mechanism, drive means for rotating said lead screw in either direction, a plurality of solenoid actuated nut assemblies on said lead screw, one of said assemblies being connected to the bell crank means at the front end of the mechanism, a second nut assembly being connected to the bell crank means at the other end of said mechanism, means interconnecting a third nut assembly to a link member connected to said base member for shifting said horizontally movable member forwardly and backwardly relative thereto, means transferring the movement of the movable elements of one mechanism to those of the other mechanism, said connection between said second nut assembly and bell crank means occurring through a pair of links connected together at one end by pivot means with the free end of one link joined to the nut assembly and the free end of the other link connected to the bell crank member, said link to which said third nut assembly is connected being of channel shape with the web portion extended and disposed through a slot in the bottom of the channel-shaped horizontally movable member and directly connected to the base, said one nut assembly having projecting pins extending in slots in the walls of the horizontally movable channel member, the pivot means connecting the two links extending in said wall slots, the pins and pivot means operating in said slots reducing the bending stress on the lead screw, a pair of torsion tubes pivotally mounted on said mechanisms and extending therebetween, like arms on the ends of one of said torsion tubes, link means interconnecting said arms to a pair of similar bell crank means one one end of the two mechanisms for causing one bell crank means to actuate said one torsion bar through one arm to actuate the other arm and link to move the bell crank means of the other mechanism a like amount, similar arms secured to the ends of the second torsion tube and links including said one link interconnecting the arms of the second torsion tube to the bell crank means at the opposite end of the mechanisms to cause the associated ends of the seat supporting elements to move like amounts when the bell crank means on the mechanism having the lead screw are operated by their solenoid operated nut assemblies.

7. In a seat supporting device, a pair of spaced mechanisms for supporting the seat, each mechanism comprising a base, a horizontally movable member on said base, and a vertically movable seat supporting element, a pair of bell crank means interconnecting the front and rear ends of the horizontally movable member and the vertically movable seat supporting member, one of said connections at one end of the device including lost motion means to permit either of the bell crank means to be operated independently of the other without binding, a lead screw mounted on one mechanism, drive means for rotating said lead screw in either direction, a plurality of solenoid actuated nut assemblies on said lead screw, one of said assemblies being connected to the bell crank means at the front end of the mechanism, a second nut assembly being connected to the bell crank means at the other end of said mechanism, means interconnecting a third nut assembly to a link member connected to said base member for shifting said horizontally movable member forwardly and backwardly relative thereto, means transferring the movement of the movable elements of one mechanism to those of the other mechanism, said connection between said second nut assembly and bell crank means occurring through a pair of links connected together at one end by pivot means with the free end of one link joined to the nut assembly and the free end of the other link connected to the bell crank means, said link to which said third nut assembly is connected being of channel shape with the web portion extended and disposed through a slot in the bottom of the channel-shaped horizontally movable member and directly connected to the base, said one nut assembly having projecting movable extending in slots in the walls of the horizontally movable channel member, the pivot means connecting the two links extending in said wall slots, the pins and pivot means operating in said slots reducing the bending stress on the lead screw, a pair of torsion tubes pivotally mounted on said mechanisms and extending therebetween, like arms on the ends of one of said torsion tubes, link means interconnecting said arms to a pair of similar bell crank means on one end of the two mechanisms for having the one bell crank means actuate the torsion bar through the one arm to actuate the other arm and link to move the bell crank means of the other mechanism a like amount, similar arms secured to the ends of the second torsion tube, links including said one link interconnecting the arms of the second torsion tube to the bell crank means at the opposite end of the mechanisms to cause the associated ends of the seat supporting elements to move like amounts when the bell crank means on the mechanism having the lead screw are operated by their solenoid operated nut assemblies, a third torsion bar pivoted between said two mechanisms, arms adjacent the ends of said torsion bar, and links interconnecting the arms and the horizontally movable members so that when one of the movable members of the one mechanism is moved horizontally by said third nut assembly the horizontally movable member on the other mechanism will move a like amount.

8. In a seat supporting device, a pair of spaced mechanisms for supporting a seat, one of said mechanisms comprising a base, a member movable horizontally on the base and a vertically movable seat supporting element, means interconnecting the front and rear ends of the horizontally movable member and the vertically movable seat supporting member, a lead screw mounted on the horizontally movable member, drive means for rotating said lead screw in either direction, and a plurality of solenoid actuated nut assemblies mounted on said lead screw, at least one of said nut assemblies having nonrotatable slidable connection to said horizontally movable member for relieving the lead screw of an excessive bending moment when operating one of said nut assemblies.

9. In a seat supporting device, a pair of spaced mechanisms for supporting a seat, one of said mechanisms comprising a base, a member movable horizontally on the base and a vertically movable seat supporting element, means interconnecting the front and rear ends of the horizontally movable member and the vertically movable seat supporting member, a lead screw carried by said horizontally movable members, and releasable and securable nut means on said lead screw for selectively moving the member horizontally and the element vertically, at least one of said nut assemblies having nonrotative slidable engagement with said horizontally movable member.

References Cited in the file of this patent
UNITED STATES PATENTS
2,809,688    Brundage _____ Oct. 15, 1957

UNITED STATES PATENT OFFICE

CERTIFICATE OF CORRECTION

Patent No. 2,929,438            March 22, 1960

Robert I. Homier

It is hereby certified that error appears in the printed specification of the above numbered patent requiring correction and that the said Letters Patent should read as corrected below.

Column 7, line 46, for "one", first occurrence, read -- on --; column 8, line 16, for "movable" read -- pins --.

Signed and sealed this 30th day of August 1960.

(SEAL)
Attest:
ERNEST W. SWIDER
Attesting Officer

ROBERT C. WATSON
Commissioner of Patents